United States Patent [19]

Meyer et al.

[11] Patent Number: 4,481,902
[45] Date of Patent: Nov. 13, 1984

[54] METHOD AND APPARATUS FOR TESTING OVERLAPPING CONNECTIONS IN STRUCTURAL COMPONENTS

[75] Inventors: Jochen Meyer, Rosengarten; Richard Wilde, Eversen-Heide, both of Fed. Rep. of Germany

[73] Assignee: Messerschmitt-Boelkow-Blohm Gesellschaft mit beschraenkter Haftung, Munich, Fed. Rep. of Germany

[21] Appl. No.: 358,858

[22] Filed: Mar. 17, 1982

[30] Foreign Application Priority Data

Mar. 25, 1981 [DE]  Fed. Rep. of Germany ....... 3111698

[51] Int. Cl.³ .............................................. G01B 13/24
[52] U.S. Cl. ........................... 116/212; 116/DIG. 34; 200/61.08
[58] Field of Search ....... 116/212, DIG. 34, DIG. 41; 73/783, 762, 768, 841, 850, 845, 851, 855; 33/174 Q; 200/61.08, 52 R; 340/686, 665

[56] References Cited

U.S. PATENT DOCUMENTS 2,437,750  3/1948  Mann ................................... 73/841

Primary Examiner—Steven L. Stephan
Assistant Examiner—Denis E. Corr
Attorney, Agent, or Firm—W. G. Fasse; D. H. Kane, Jr.

[57] ABSTRACT

Overlapping connections of sheet metal members in structural components are tested for cracks or flaws which are primarily the result of wear and tear under operating load conditions. For this purpose a test hole is made into or through the overlapping sheet metal members whereby each sheet metal member is provided with its own test hole portion. As long as the connection is still in good condition, adjacent test hole portions remain in register with each other. A sensor is inserted into the test hole. The sensor provides an indication of a faulty connection when the test hole portions are no longer in register. Several different types of sensors may be employed. The monitoring of the test holes and/or sensors may be made in a manual or automatic manner.

16 Claims, 7 Drawing Figures

METHOD AND APPARATUS FOR TESTING OVERLAPPING CONNECTIONS IN STRUCTURAL COMPONENTS

CLAIM TO PRIORITY

The present application is based on German Ser. No. P 31 11 698.1, filed in the Federal Republic Of Germany on Mar. 25, 1981. The priority of the German filing date is claimed for the present application.

BACKGROUND OF THE INVENTION

The present invention relates to a method and apparatus for testing overlapping connections in structural components. More specifically, the invention provides means for testing of structural components in the zone where two structural members which are interconnected with each other overlap each other in order to ascertain cracks or other flaws in such a connection. Such other flaws may, for example, involve loosening of the connection. Any of these flaws may occur due to the loads to which the connection is subjected during the operational life of such structural components comprising the overlapping connection.

Overlapping connections of this type may comprise riveted connections, welded connections, adhesively bonded connections and so forth. Such connections are used in many different engineering fields, for example in aircraft engineering, in the boat and ship building industry, in bridge and building construction work, in the container construction field and in many other areas. Structural components which are subject to loading or rather subject to stress of a dynamic and/or static nature during their operational life are exposed to the danger that especially in the zone where structural member overlap faults may occur in the form of cracks or in the form of a loosening of the interconnection. Such faults may severely reduce the structural strength of the overlapping connections, whereby the entire structural component is adversely affected. Under extreme load conditions such cracks or loosening of the connection may even result in incapacitating the particular structural component for its intended purpose and may even lead to a complete break down.

In view of the above it is important that such connections may be frequently tested throughout their operational life, especially where the safety of humans and materials is endangered. Thus, such frequency tests without destroying the structural component, or rather the overlapping connection are especially important, for example, in ship building, in the aircraft industry, and in the structure of bridges and fluid containers.

Heretofore such testing of the overlapping connections had to be performed by skilled personnel employing optical testing means. Such "optical means" may involve a mere visual inspection on the one hand and may range to the use of involved measuring equipment including X-ray equipment. However, such equipment is generally too involved and too complicated for use in connection with frequently recurring inspections or tests, especially if one takes into account how many such overlapping connections are to be tested, for example, in a large bridge or in an aircraft fuselage.

In order to make structural components of this type less prone to failure under the operating conditions, it has been frequently the practice heretofore to strengthen the structural components in the zone of the overlapping interconnection as a matter of precaution. Such strengthening will normally prevent that a small crack is able to expand or increase to an extent which would have catastrophic effects. However, this approach does not improve the possibilities of controlling or testing such connections. Besides, strengthening all the connections in a structure is rather expensive, particularly where many such connections must be strengthened. Additionally, such strengthening of the structure of the overlapping interconnections greatly increases the weight of the entire structural component, for example, of the aircraft fuselage which is not desirable.

OBJECTS OF THE INVENTION

In view of the above it is the aim of the invention to achieve the following objects singly or in combination:

to provide an apparatus and method for testing overlapping connections in structural components in which tests may be performed frequently without any substantial expenditure in equipment and man hours;

to provide a simple test for such connections which may be performed with certainty by a mere visual inspection; and to provide a test which may be performed by using any one of a larger number of possible types of sensors adapted to facilitate the visual inspection or an automatic monitoring.

SUMMARY OF THE INVENTION

The method according to the invention comprises the following steps. First, at least one, preferably a plurality of test holes are made into or through the interconnected members of the overlapping connection when the latter is still new and in satisfactory condition. The hole must be deep enough to provide at least two hole portions, one of which is in one of the connected members and the other hole portion of which is in the other connected member. The holes remain in register with each other as long as the connection is in the satisfactory condition. Thereafter, during the operational life of the connection the holes are checked whether adjacent test hole portions are still in axial register or alignment with each other. A lateral shift of one hole relative to the other will indicate a faulty connection.

The apparatus according to the invention comprises at least one test hole having a test hole portion in each interconnected member. The test hole portions remain in axial alignment with each other as long as the connection remains in satisfactory condition. Sensor means are operatively arranged for sensing the axial alignment of the test hole portions during the operational life of the connection. The sensor means provide an indication of any axial misalignment of adjacent test hole portions when the connection is defective. The axial misalignment resulting from a lateral shift of the connected members relative to each other provides a shearing load which is used according to the invention for activating the sensor.

If in the connection a loosening occurs or if the connection starts yielding due to cracks, the forces effective on the two structural components in the overlapping zone will cause a certain shearing load which is effective in the plane between the two interconnected structural members perpendicularly to the longitudinal axis of the test bore or hole. As stated above, the resulting shearing displacement is utilized according to the invention for facilitating the recognition of a fault and for its indication if desired in a manual or automatic manner.

The relative size of the shearing displacement of one structural member, such as a piece of sheet metal, relative to the other structural member which may also be a piece of sheet metal, is defined by the ratio of the critical value of the displacement $\Delta L$ to the diameter d of the testing or sensing hole or bore which, incidentally, may be a dead-end hole as long as at least one of the interconnected members is fully penetrated and a portion of the hole extends in the other connected member. Thus, the relative size of the shearing displacement may be adapted to the intended detection method or sensing method by a suitable selection of the diameter of the bore, whereby technical details of the particular type of situation may also be taken into account in selecting said hole diameter d. Depending on the selection of the just mentioned ratio of the value $\Delta L$ to the diameter d the test bore may, for example, be completely closed as a result of a material displacement in said overlapping zone of the connection. On the other hand, the hole may only be closed to about one half of its diameter or even less. In all these circumstances a proper sensing is possible and the type of the detection method will be selected in accordance with its best suitability for the particular situation. The particular test method may, for example, be selected with due regard to the fact whether the test bores are accessible on one side only or from both sides of the interconnected members of a structural component. The number of testing holes or bores will also depend on the particular situation and on the question how often such a test or checking is required to be performed for a safe monitoring of the operational state of the connection.

It has been found that many different sensing and detecting methods and devices may be used for detecting the shearing displacement and thus for detecting of any faults in the zone of the overlapping connection. A number of examples for the testing or inspection will be listed here. These include; visual inspection, contacting or sensing the test bore with a fitting set pin, checking a set pin in the test hole whether the test pin is movable or jammed, whereby the test pin is preferably inserted into the hole under spring bias. The visual inspection may be facilitated, for example, by filling the test hole with a colored plastic material which is preferably contained in a hollow test pin glued into the test hole or screwed into the test hole. If both sides of the connection are accessible, light passing through the test hole may be sensed. The passage of gases or liquid through the test hole may be sensed. The load take-up of a screw bolt inserted into the test hole may be measured. The measuring screw bolt is, for example, provided with a foil strain gage or sensing washers of piezoelectric material may be used. Damage or penetration or perforation of an insulating layer may be sensed, whereby such layer normally surrounds a test pin inserted into the test hole. The shearing displacement or the resulting shearing load damages the insulating layer and if the shearing displacement exceeds the thickness of the insulating layer, an electrical contact between a conducting set pin is established and at least one of the interconnected members, whereby this contact may then be used for evaluating the extent of the damage to the connection. A set pin may, for example, be made of brittle material such as ceramic or synthetic material in which an electrical conductor is inserted which normally closes a control or testing circuit. Such circuit is interrupted when the set pin should break, thereby indicating an unpermissible shearing displacement in the test hole. In a modification of this concept one end of a set pin may be held with a press fit in one hole portion while the shaft of the pin extends through the other hole portion and out of the test hole so that when the set pin of brittle material is distroyed by the shearing displacement a portion of the set pin falls out of the test hole, preferably aided by the action of a spring which ejects the severed portion of the set pin.

Other sensors and detecting steps may be used. In any event, it will be appreciated that a very simple testing operation and sensing device may be employed in accordance with the invention for the above outlined purposes.

BRIEF FIGURE DESCRIPTION

In order that the invention may be clearly understood, it will now be described, by way of example, with reference to the accompanying drawings, wherein.

Figure 3A:
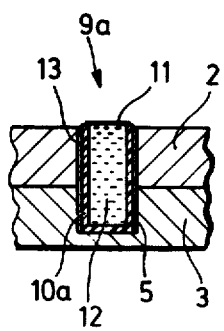
Figure 3B:
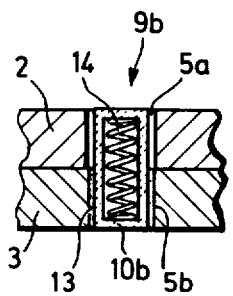
Figure 3C:
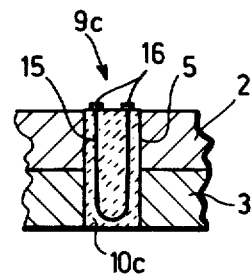
Figure 4:
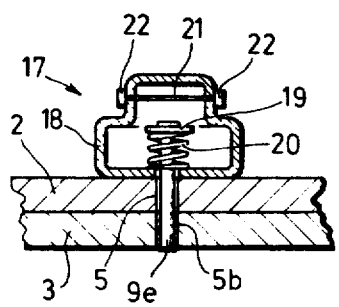

FIGS. 3a, 3b, 3c and 3d show sectional views through various embodiments of a sensing set pin fitting into the test bore in the zone of overlapping connections for monitoring or checking the condition of such connections; and FIG. 4 shows a sectional view through still another embodiment of a sensing device according to the invention to thereby monitor or check the operational condition of the overlapping connection.

DETAILED DESCRIPTION OF PREFERRED EXAMPLE EMBODIMENTS AND OF THE BEST MODE OF THE INVENTION

Figure 1:
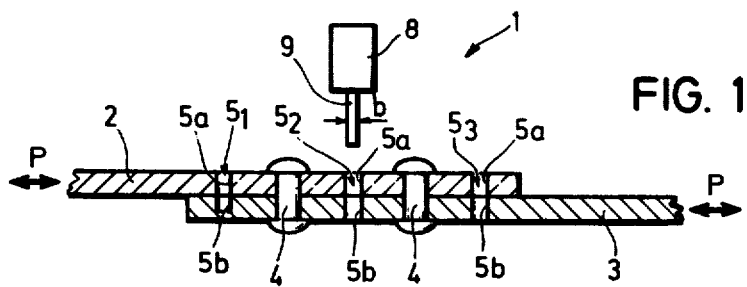
FIG. 1 is a sectional view through a rivet connection with overlapping sheet metal members provided with a number of test bores or holes in accordance with the invention.

FIG. 1 shows an overlapping connection of a structural component 1 illustrating a riveted connection of two sheet metal members 2 and 3 interconnected by rivets 4. The sheet metal members 2 and 3 are, for example, made of light metal or steel and may be part of a fuselage or of a boat hull not shown. During its operational life the structural component 1 or rather, the connection is subject to shearing loads indicated by the double arrows P.

In order to test or check the functional satisfactory condition of the overlapping connection 1 during its operational life, the invention teaches to drill holes into the connection such as are shown at $5_1$, $5_2$, and $5_3$. These holes pass either entirely through both sheet metal members 2, 3 as shown at $5_2$ and $5_3$ or they may form a dead-end hole $5_1$. In all instances each hole comprises two hole portions 5a and 5b which in the normal undisturbed condition of the connection 1 are axially aligned with each other in a direction extending perpendicularly to the plane defined by the two sheet metal members 2, 3. These test holes are relatively small in their diameter and do not adversely affect the strength of the connection or of the structural component to any appreciable degree. The holes may be located between adjacent rivets and/or outside the adjacent rivets as long as they pass into both adjacent members. Normally, both hole portions 5a and 5b will have the same diameter. The invention may be practiced with any type of hole as long as the hole passes through the plane defined between the two sheet metal members. The type of hole will be determined by the particular type of application. In any event, the test holes are applied or made in the overlapping connection as long as the latter is still in its new condition.

Figure 2:
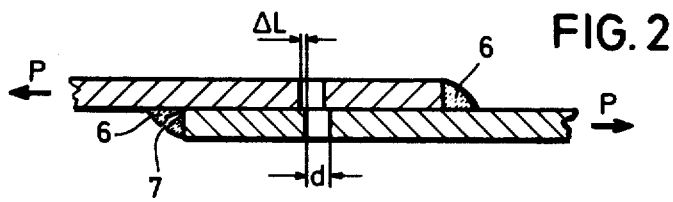
FIG. 2 shows an overlapping welded connection illustrating the lateral shearing displacement after one of the two welding seams has failed.

FIG. 2 shows a sectional view of a welded connection with welding seams 6 and 6' in the corners between the overlapping sheet metal portions 2' and 3'. The connection is subject under its operating conditions to tension loads indicated by the arrows P'. As a result of these loads, the welding seam 6' has a crack 7. Hence, the two hole portions 5a and 5b have been laterally displaced relative to each other by a shearing displacement ΔL. Normally, both hole portions 5a, 5b would be aligned relative to their common vertical axis so that the two hole portions normally register exactly with each other. Both hole portions have, for example, the same hole diameter "d". When the shearing displacement ΔL, or rather the ratio between the shearing displacement ΔL and the diameter d reaches a certain predetermined value, which is a critical value that may differ for different connections, the capacity of the entire structural component for proper function is not assured anymore.

As shown in FIG. 1 the shearing displacement ΔL may, for example, be tested by a tool 8 equipped with a sensing pin 9 having a diameter "b" fitting into the respective test hole. The diameter "b" of the sensing or fitting pin 9 may, for example, correspond to the diameter "d". After a connection or structural component has been in operation for a certain length of time, the pin 9 may be easily inserted into the test holes 5 and such easy insertion is an indication that no damage has resulted as yet by any cracks 7 as are, for example, shown in FIG. 2.

However, the diameter "b" of the testing or set pin 9 may be selected to be smaller than the diameter d, whereby the smaller diameter "b" is chosen with due regard to the above mentioned critical shearing displacement ΔL. More specifically, the diameter "b" must be such as to permit the recognition of minor shearing displacements which are small enough to still be tolerated. In other words, the permissible shearing displacement would be slightly smaller than the above mentioned critical displacement.

As long as the pin 9 fits into both hole portions 5a and 5b the overlapping connection 1 may be considered to be functionally in good order. Only when the pin 9 does not pass through both hole portions, the testing will show that the critical displacement ΔL has been exceeded, thereby revealing a fault such as a crack pattern which is likely to make the connection inoperable.

As is illustrated in FIGS. 3a, 3b, 3c and 3d different types of sensing elements in the form of fitting test pins 9a, 9b, 9c and 9d may be employed as shown in these figures.

FIG. 3a shows a cylindrical sensing or testing pin 9a comprising a cylinder bushing 10a made of solid elastic material covered at its outwardly facing top with a relatively thin membrane 11 which may be transparent. The inside space of the testing pin 9a is filled with a paste-like colored material 12. The hole 5 in FIG. 3a is a dead-end hole and the cylinder sensing pin 10a is glued into the hole by an adhesive 13 provided along the entire surface between the cylinder jacket and the inwardly facing wall surfaces in the sheet metal members 2 and 3. If now the above described shearing displacement results in a lateral displacement of the member 2 relative to the member 3, the colored paste-like material 12 is squeezed out of the cylinder bushing 12a or at least the membrane 11 starts to bulge outwardly, thereby showing that the connection does not satisfy its operational conditions anymore.

FIG. 3b shows a modified sensing pin 9b comprising a hollow cylinder 10b and a biasing compression spring 14 inside the hollow cylinder 10b which is, for example, made of a brittle material such as ceramic. The sensing pin 9b is secured with adhesive 13 in the hole portion 5b while the upper end of the sensing pin 9b passes with clearance through the hole 5a. The clearance in the hole portion 5a will be selected in accordance with the above described criteria for a still permissible shearing displacement. If now the displacement of the sheet metal members 2 and 3, for example, due to cracks or other faults exceeds the permissible shearing displacement, the ceramic cylinder 10b will break and its upper portion will be expelled by the spring 14. This expelling again is an indication that the permissible shearing displacement has been exceeded in the overlapping connection.

FIG. 3c shows an embodiment in which the testing pin 9c comprises a plug 10c of brittle material such as ceramic fitting snugly into the hole 5 and passing through both sheet metal members 2 and 3. an electrical conductor loop 15 passes through the insulating brittle material of the plug 10c sufficiently so that the shearing displacement in the plane defined between the two sheet metal members 2, 3 will interrupt the conductor loop 15. The outer ends of the conductor loop 15 are connected to two electrical contacts 16 which may be utilized in a monitoring circuit arrangement. When the cylinder 10c and thus the conductor loop 15 break, the current flow through the monitoring circuit including the contact 16 is interrupted and such circuit interruption may be used to provide a monitoring indication of the failure or impending failure of the connection. Where both surfaces of the connection are accessible, the loop 15 may be replaced by a straight conductor, each end of which would be provided with a contact 16 at each end of the plug 10c.

Figure 3D:
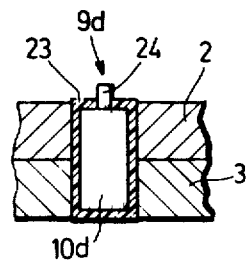

FIG. 3d shows an overlapping connection with a set or sensing pin 9d comprising an electrically conducting cylindrical core 10d surrounded by an electrically insulating jacket 23 which is made of a material that may be penetrated by the shearing displacement so that the conducting core 10d will be contacted by one of the sheet metal members 2 or 3, thereby closing an electrical circuit through the contact pin 24 and the respective sheet metal member. The insulating coating or jacket 23 may be provided, for example, in the form of a layer of paint, the thickness of which is so determined that it is peforated by a predetermined critical shearing displacement, whereby the above described electrical circuit is closed and the closure of the circuit may be used for the monitoring purposes in an automatic manner.

FIG. 4 illustrates a sensor 17 for testing or monitoring the operational capacity of the overlapping connection between the two sheet metal members 2 and 3 by means of a sensing or fitting pin 9e also made of a brittle material such as ceramic. The pin 9e has a first end glued into the hole portion 5b by a suitable adhesive or held therein with a press fit. The pin has a second upper end forming a head which reaches out of the hole portion in the upper sheet metal member 2 while an intermediate shaft portion of the pin 9e passes with clearance through the hole portion in the upper sheet metal member 2. A spring 20 such as a compression spring is held in place between the upper head end of the pin 9e and the adjacent sheet metal member 2 by a washer 19. If the pin 9e breaks due to a shearing displacement, the spring 20 will cause the second end with the head 23 to pop off thereby indicating an impending failure.

If desired, the upper end of the pin 9e may be enclosed in a housing 18 secured to the adjacent sheet metal member 2. An electrical conductor member 21, for example, a wire or an electrically conducting membrane 21 passes through insulators in the housing for connection to contacts 22. The conductor 21 is so positioned relative to the pin head that rupture of the pin 9e causes the spring 20 to propel the upper end of the pin against the conductor 21, thereby breaking the conductor 21 and simultaneously interrupting an electrical circuit for a monitoring purpose. The monitoring circuit comprising the conductor 21 and the contacts 22 may be part of an electronic monitoring device providing an automatic indication of an impending failure when the pin 9e breaks as a result of a shearing displacement.

In view of the foregoing it will be appreciated that the invention discloses a method and apparatus which is relatively easy and inexpensive for implementation in the testing and monitoring of structural components including overlapping connections as described. The inspection may be manual, or rather visual, or it may be automatic to provide an alarm for any impending malfunctions. In all the embodiments the costs are substantially smaller than in conventional monitoring methods and devices. Further, the method and apparatus according to the invention is highly reliable for its purpose and the monitoring may be performed on a continuous or periodically repeated basis. Thus, even small starting cracks or fissures may be discovered before the overlapping connection becomes incapacitated. This is partly due to the size of the holes and the materials used for the elements 9a, 9b, 9c, 9d, and 9e, which are brittle or elastic so that they are not able to appreciably affect the strength or rigidity of the overlapping connection.

Although the invention has been described with reference to specific example embodiments, it will be appreciated, that it is intended to cover all modifications and equivalents within the scope of the appended claims.

What is claimed is:

1. A method for testing an overlapping connection between normally rigidly interconnected structural components wherein at least two overlapping, rigidly interconnected members form the connection along an interface between the two adjacent members which normally maintain their position relative to each other unchanged, comprising the following steps: making at least one test hole into or through the interconnected members and through said interface in their new condition or form test hole portions which are in axial register with each other as long as the connection is in a satisfactory condition as evidenced by the unchanged position of said two members relative to each other, checking during the operational life of the connection whether adjacent test hole portions are still in axial register with each other and hence substantially free of any effects which would appreciably affect the strength of the connection, and noting any displacement of said members relative to each other as a result of load applications.

2. The method of claim 1, further comprising inserting a sensor into said test hole for sensing a misalignment of the test hole portions, and checking the sensor for any misalignment.

3. An apparatus for testing an overlapping connection of structural components wherein at least two overlapping rigidly interconnected members form the connection along an interface between the two members, comprising at least one test hole having a test hole portion in each interconnected member and extending through said interface, said test hole portions remaining in axial alignment with each other as long as the connection remains in satisfactory condition, and sensor means free from appreciably affecting the rigidity of the connection and operatively arranged for sensing said axial alignment of the test hole portions during the operational life of the connection, said sensor means providing an indication of any axial misalignment of adjacent test hole portions when the connection is defective as a result of a displacement of said two members relative to each other at said interface.

4. The apparatus of claim 3, wherein said sensor means comprise a test pin fitting into said test hole.

5. The apparatus of claim 4, wherein said test hole has a given diameter, said test pin having the same diameter.

6. The apparatus of claim 4, wherein said test hole has a given diameter, said test pin having a diameter smaller than the given diameter of the test hole.

7. The apparatus of claim 5 or 6, wherein said test pin comprises a hollow, deformable cylinder filled with a colored material, said deformable cylinder being inserted in said test hole, closure means (11) normally closing one end of the deformable cylinder for opening the cylinder in response to a deformation of said deformable cylinder when said overlapping interconnected members are displaced relative to each other to thereby expose said deformable cylinder to a shearing load which causes said opening of the deformable cylinder to thereby make said colored material visible.

8. The apparatus of claim 3, wherein said sensor means comprise a plug of plastic material which normally, when the connection is in satisfactory condition, fills the hole and which is squeezed out of the hole at least partially by a shearing load when the overlapping interconnected members are laterally displaced relative to each other, whereby an unsatisfactory condition of the connection is indicated.

9. The apparatus of claim 3, wherein said sensor means comprise a test pin fitted into said test hole when the overlapping connection is in a satisfactory condition, said test pin being deformable or destructable by a lateral displacement of said interconnected members relative to each other, whereby a faulty condition of the connection is made visible.

10. The apparatus of claim 9, wherein said test pin comprises a closed hollow cylinder made of a relatively brittle material which breaks in response to a shearing load resulting from a lateral displacement of the interconnected members relative to each other, said test pin further comprising a biased compression spring inside said hollow cylinder, said biased compression spring pushing a portion of said hollow cylinder out of the test hole in response to the destruction of the hollow cylinder by said shearing load for making visible a faulty condition of the connection.

11. The apparatus of claim 9, wherein said test pin is a cylinder of brittle destructable material which breaks in response to a shearing load resulting from a lateral displacement of the interconnected members relative to each other, said sensor means further comprising electrical conductor means (15) in said brittle destructable material, said electrical conductor means being interruptable in response to a breaking of the test pin as a result of an occurrence of said shearing load.

12. The apparatus of claim 11, wherein said brittle destructable material is an electrically insulating material, said electrical conductor means forming a loop extending through said insulating material, said sensor means further comprising externally accessible electrical test contact means (16) connected to said loop for checking whether said loop of said electrical conductor means is interrupted or not.

13. The apparatus of claim 9, wherein said test pin comprises a cylindrical core of electrically conducting material, a jacket of electrically insulating material enclosing said cylindrical core, and contact means connected to said cylindrical core and extending through said jacket outwardly for checking whether said jacket of electrically insulating material has been perforated by a lateral displacement of said interconnected members relative to each other.

14. The apparatus of claim 3, wherein said sensor means comprise a test pin of relatively brittle material having a first end, a shaft and a second end with a head, said first end extending into said test hole and with a holding fit into that test hole portion which is remote from the second end of the test pin, said shaft extending with a slide fit through that portion of the test hole which is closer to said second end of the test pin, said second end of the test pin extending out of the test hole, said sensor means further comprising biasing spring means (20) normally held in position around said second test pin end and between said test pin head and the adjacent connected member, said biasing spring means expelling a portion of said test pin out of the test hole in response to a lateral displacement of the overlapping interconnected members relative to each other, whereby an unsatisfactory condition of the connection is indicated.

15. The apparatus of claim 14, further comprising housing means (18) secured to said adjacent connected member, said second end of the test pin and said biasing spring means extending into said housing means, an electrical conductor in said housing means and insulated from the housing means in a position for cooperation with said test pin head for interrupting the electrical conductor by said second end of the test pin when the test pin is destroyed, whereby the biasing spring means projects the test pin head against the electrical conductor with sufficient force to interrupt the electrical conductor.

16. The apparatus of claim 15, further comprising electrical contact means insulatedly held in said housing means and electrically connected to said electrical conductor for interrupting a circuit when said electrical conductor breaks.

* * * * *

UNITED STATES PATENT AND TRADEMARK OFFICE
CERTIFICATE OF CORRECTION

PATENT NO. : 4,481,902

DATED : November 13, 1984

INVENTOR(S) : Jochen Meyer, Richard Wilde

It is certified that error appears in the above—identified patent and that said Letters Patent is hereby corrected as shown below:

Claim 1, line 10, replace "or" by --to--.

Signed and Sealed this

Twenty-first Day of May 1985

[SEAL]

Attest:

DONALD J. QUIGG

Attesting Officer

Acting Commissioner of Patents and Trademarks